United States Patent [19]

Bergishagen

[11] Patent Number: 5,063,251

[45] Date of Patent: Nov. 5, 1991

[54] BLOWING AND CURING OF RESINS AND PLASTICS MATERIALS WITH CYCLODEXTRIN COMPLEXES

[75] Inventor: Finn Bergishagen, Union Lake, Mich.

[73] Assignee: American Maize-Products Company, Stamford, Conn.

[21] Appl. No.: 518,794

[22] Filed: May 4, 1990

[51] Int. Cl.$^5$ .............................. C08J 9/12; C08J 9/14
[52] U.S. Cl. ..................................... 521/84.1; 521/82; 521/88; 521/94; 521/96; 521/109.1; 521/143; 521/145; 521/146; 521/147; 521/149
[58] Field of Search ............................. 521/84.1, 109.1

[56] References Cited

U.S. PATENT DOCUMENTS

| | | | |
|---|---|---|---|
| 3,957,702 | 5/1976 | Molotsky et al. | 528/72 |
| 4,150,192 | 4/1979 | Downey | 428/462 |
| 4,681,934 | 7/1987 | Shibanai et al. | 536/46 |
| 4,711,936 | 12/1987 | Shibanai et al. | 525/485 |

OTHER PUBLICATIONS

Uniroyal, Chemical Blowing Agents Selector Guide, ASP-4384.
R. LaClair, "Blowing Agents for Structural Foam Molding", *Plastics Technology*, 22, 3, pp. 31-36, 1977.
M. Reisch, "Adhesives and Sealant Formulators Look to Specialties for Growth", *Chem. and Eng. News*, Feb. 27, 1989.
D. Rowland, "Blowing Agents", May 1977.
Uniroyal, Celogen Blowing Agents, ASP-3122.

*Primary Examiner*—Morton Foelak
*Attorney, Agent, or Firm*—Lucas & Just

[57] ABSTRACT

The blowing agent is a complex of cyclodextrin and guest blowing agent. Suitable guest blowing agents include water, propylene glycol and cyclohexylalamine. The blowing agent is used in structural foam and adhesives.

19 Claims, No Drawings

BLOWING AND CURING OF RESINS AND PLASTICS MATERIALS WITH CYCLODEXTRIN COMPLEXES

This invention relates to blowing agents and more particularly to chemical blowing agents which, upon heating, release a gas and cause a fluidized plastic material to expand.

Blowing agents, sometimes referred to as foaming agents, are substances that produce a cellular structure in a fluidized plastic or rubber composition. Conventional blowing agents include fluorocarbons, nitrogen gas, hydrazine derivatives, trihydrazide triazine, 5-phenyl tetrazole, p-toluene sulfonyl semicarbazide, modified azodicarbonamide, and azodicarbonamide. Chemical blowing agents are a class of blowing agents which are solids or liquids at room temperature and, upon heating, release a gas. A well-known class of chemical blowing agents are sold under the trademark CELOGEN by Uniroyal, Inc.

The hardened plastic or rubber compositions having a cellular structure resulting from the use of a blowing agent are generally referred to as structural foam, cellular polymer, cellular plastic, plastic foam, foamed plastic, and expanded plastic. Probably one of the first synthetic cellular plastics was sponge rubber. For purposes of definition, the material which is expanded by the blowing agent will generally be referred to as a plastic material, unless a specific species of plastic material is referred to such as a sealant, an adhesive or ethylene vinyl-acetate (EVA).

Blowing agents are used in making a variety of consumer products; for example, furniture and building materials like upholstery materials; floor, wall or ceiling tiles; picture and mirror frames; drawer cabinets; decorator items; planters; doors; trim or finish moldings; lamps; appliance parts; wine racks; couch and chair frames; shutters; and bed frames. Blowing agents are also used in making automotive parts such as battery cases; fan shrouds; glove box doors; air conditioner duct work; upholstery materials; cushioning materials; bucket seat frames; and automative sealants. Blowing agents are used with plastic materials to make marine parts such as boat ladders; sailboat center boards; buoys and floats; modular hulls; and lobster pots. Additionally, blowing agents are used with plastic materials to make pallets, trays, soda cases; tote boxes, drums and various containers; ice buckets; bird baths; croquet mallets and balls; child toys; parts for recreation vehicles; bowling pins; shuffle board equipment; sporting equipment such as hockey sticks and baseball bats; and footwear. Further, blowing agents are used with adhesive plastic materials in a hot melt adhesive. Blowing agents are also used in foodstuff wrapping which is applied to the exterior of animal parts after they have been butchered and prior to wholesale. Such product is referred to by some as "bone wrap".

Typically, chemical blowing agents are used by mixing the chemical blowing agent with a solid plastic material and then heating the admixture while maintaining the mix under pressure. Heating fluidizes the plastic material and causes the blowing agents to release a gas. The gas forms bubbles or cells in the fluid plastic material. The mixture is maintained under pressure until it is placed into a mold where the gas expands and in turn causes the fluid plastic material to expand. Upon solidifying, the cell structure remains. Different blowing agents release gas at different temperatures and the choice of blowing agent depends on the processing conditions, plastic material and the size of the desired gas cells.

Chemical blowing agents have the advantage over gaseous blowing agents in that they can be added to the solid plastic material prior to heating. Gaseous blowing agents such as nitrogen and some fluorocarbons must be injected into the fluidized plastic material. With hot melt adhesives and sealants, a gas is mixed with the adhesive composition prior to the end of the nozzle.

The use of fluorocarbons as blowing agents has come under close scrutiny due to its alleged affect on the earth's ozone layer. Other conventional blowing agents present problems with handling, toxicity, and flammability. Handling problems include storage stability, dust, and explosion hazzards.

It has now been discovered that a complex of cyclodextrin and blowing agent functions as a blowing agent in fluidized plastic materials. The cyclodextrin has been found to stabilize the blowing agent. It has also been discovered that certain chemical compounds can be used as blowing agents which were heretofore never used as blowing agents.

The present invention relates to a method for expanding a plastic material comprising the steps of forming an admixture comprising a plastic material and a complex of a blowing agent and a cyclodextrin and heating the admixture so as to fluidize the plastic material and cause the complex to release a gas. The gas forms cells in the fluidized plastic material.

A step of forming a complex between the cyclodextrin and the blowing agent is accomplished prior to the step of mixing the complex with the plastic material.

The step of heating the admixture is accomplished either by applying heat to the admixture as is typically the case in a conventional extrusion process, blow molding process, or through the heat of reaction, an exothermic reaction, such as is normally the case with a polyurethane.

An expandable plastic composition made in accordance with the present invention comprises a plastic material and a complex of cyclodextrin and blowing agent. Expandable plastic compositions are used to make, for example, structural foam objects and certain adhesives.

A structural foam object formed in accordance with the present invention is made by heating and molding an admixture of a structural plastic material, and a complex of a blowing agent and a cyclodextrin.

An adhesive and/or sealant composition made in accordance with the present invention comprises an adhesive and/or sealant plastic material, and a complex of a blowing agent and a cyclodextrin.

Cyclodextrins, also called "Schardingers dextrins", cycloamyloses, cyclomaltoses and cycloglucans, are oligomers of anhydroglucose, bonded together by alpha 1,4 bonds to form a ringed compound. A six membered ring is called alpha cyclodextrin; seven, beta cyclodextrin, and eight, gamma cyclodextrin. These six, seven and eight membered rings are also referred to as cyclomaltohexaose, cyclomaltoheptaose and cyclomaltoctaose, respectively.

Conventionally, cyclodextrins are obtained by treating a starch slurry with enzyme or acid to produce a gelatinized and liquefied slurry having a DE between 1 and 5. The gelatinized and liquefied starch slurry is then treated with cyclodextrin glycosyltransferase (CGT), at the appropriate pH, temperature and time for the selected CGT. The enzyme, CGT, is obtained from microorganisms such as *Bacillus macerans, B. magaterium, B. circulans, B. stearothermophilus,* and *Bacillus* sp. (alkalophilic) as well as others. The resulting digest from treatment of a gelatinized and liquefied starch slurry with CGT is then subjected to a separation and purification process to obtain cyclodextrins.

One of the commercially important aspects of cyclodextrins is their ability to act as a clathrate or host to other commercial compounds. Physically a cyclodextrin is donut-shaped. The consequence of this is that cyclodextrins are able to act as a clathrate with substances that have outer geometric dimensions corresponding to the diameter of the cyclodextrin cavity. Often the exterior is modified by adding a side chain onto the donut-shaped exterior of the cyclodextrin such as hydroxypropyl cyclodextrin. The term "cyclodextrin" as used in the specification and claims means not only cyclodextrin per se but also modified cyclodextrins and branched cyclodextrins.

The term "complex" or the expression "complex of cyclodextrin and blowing agent" as used in the specification and claims means not only a composition of cyclodextrin and blowing agent where the cyclodextrin acts as a host to the blowing agent but also where the blowing agent is closely associated with the exterior of the cyclodextrin by weak bonding forces.

A method for formation of a complex between a cyclodextrin and a blowing agent involves dissolving the cyclodextrin in water with a blowing agent and collecting the precipitate that forms.

Another method is by charging a ball mill with a cyclodextrin and a blowing agent and milling the charge in the ball mill for a period of time, a complex will form between the cyclodextrin and the blowing agent. Other known methods for forming a complex between a cyclodextrin and a guest molecule include kneading, freeze-drying and co-grinding. Good results have been obtained by co-grinding using a mortar and pestle.

Suitably, the cyclodextrins used in the present invention are alpha, beta or gamma cyclodextrin. Beta cyclodextrin is preferred because of its commercial availability. A complex made from a combination of all three cyclodextrins provides different rates of release of the blowing agent. This is thought to be due in part to the different bond strengths between the blowing agent and the different cyclodextrins.

Suitable blowing agents include liquids such as water, propylene glycol, dipropylene glycol, tripropylene glycol, cyclohexyl amine, dicyclohexyl amine and ethylene glycol and solids such as benzoyl peroxide and other peroxides which are difficult to process. It is both surprising and unexpected that water, propylene glycol, dipropylene glycol, tripropylene glycol, and ethylene glycol are useful as blowing agents. Heretofore, water, propylene glycol, dipropylene glycol, tripropylene glycol, and ethylene glycol were not used as blowing agents due to their poor dispersion in plastic materials. Solids such as benzoyl peroxide are difficult to process because of low decomposition temperature. Both water and propylene glycol are considered safe and non-toxic to humans. Many conventional blowing agents are toxic to humans. The use of such non-toxic blowing agents in the workplace brings a degree of safety to the workplace heretofore unknown. By using a combination of two or more blowing agents such as water and propylene glycol or by using different cyclodextrins with the same blowing agents, the application temperature of the blowing agent is varied.

Additionally, conventional chemical blowing agents such as hydrazine derivatives, trihydrazine triazine, 5-phenyl tetrazole, p-toluene sulfonyl semicarbazide, modified azodicarbonamide, and azodicarbonamide which form a complex with cyclodextrin may be used as a blowing agent in accordance with the present invention. Conventional blowing agents complexed with cyclodextrin reduce dusting and stabilize the composition.

The amount of blowing agent that is complexed with the cyclodextrin is about 1 to about 30 parts by weight based on 100 parts by weight cyclodextrin (phc). More preferably about 3 to 15 phc. Most preferred is to complex between about 5 to about 7 phc of the blowing agent with the cyclodextrin.

In forming the complex between the cyclodextrin and blowing agent, an excess amount of blowing agent is used to form the complex.

A suitable source of the complex of cyclodextrin and water has been found to be the cyclodextrin as taken from a commercial operation for making cyclodextrin. The cyclodextrin obtained from a commercial process generally has about 10 to about 12 phc water. Using this cyclodextrin in an adhesive composition has been found to provide adequate gas upon heating such that the commercially obtained cyclodextrin which is complexed with about 10 to about 12 phc water, works as a blowing agent Generally, it had been found that the smaller particle size of the complex, the more uniform the bubbles were in size. Good results have been obtained with a complex of cyclodextrin and a blowing agent having a particle size capable of passing through 200 mesh.

Suitable plastic materials include polymers such as polystyrene, polyvinyl chloride, polyethylene, polyurethane, polyphenols, polypropylene, polyisoprene (rubber), polybutadiene as well as copolymers such as acrylonitrile-butadiene-styrene, styrene-isoprene, ethylene-butylene, styrene-butadiene rubber and ethylene vinyl acetate.

A structural foam object is made by forming an admixture of a structural plastic material and about 1 to about 15 parts by weight of a complex of cyclodextrin and blowing agent based on 100 parts by weight plastic material (php); heating the admixture to cause the plastic material to expand; and allowing the expanded admixture to cool. More specifically, a structural foam object is made in a conventional manner by adding about 1 to about 10 php of a complex of blowing agent and cyclodextrin into the hopper of an extruder along with the structural plastic material. The complex of the present invention is mixed with the plastic material and then the admixture is subjected to a conventional molding operation wherein the admixture is heated and the fluidized plastic material fills the mold. Such molding process is conventional. The complex of the present invention replaces conventional chemical blowing agents in the molding processes.

Examples of structural plastic material include polystyrene, polyethylene, polyurethane, polyisoprene, epoxy resin, and polyvinyl chloride.

An adhesive and/or sealant composition made in accordance with the present invention comprises an adhesive plastic material and about 1 to about 30 php of a complex of a blowing agent and cyclodextrin.

Examples of adhesive plastic materials include ethylene vinyl acetate (EVA), acrylanitrile-butadiene-styrene and styrene-isoprene. Good results have been obtained using the complex of the present invention with EVA.

The expandable plastic composition of the present invention comprises about 1 to about 15 php of a complex of a blowing agent and cyclodextrin and a plastic material. This expandable plastic composition is made by admixing the complex with the plastic material.

A typical adhesive made in accordance with the present invention comprises:

|  | Parts by Weight |
| --- | --- |
| EVA | 25-50 |
| Modified Resins | 25-60 |
| Waxes | 0-30 |
| Total Adhesive Plastic Material | 100 |
| Antioxidant | 0.05-0.5 php |
| Filler | 0-100 php |
| Blowing Agent-Cyclodextrin Complex | 1-10 php |

A bookbinding adhesive made in accordance with the present invention comprises:

|  | Parts by Weight |
| --- | --- |
| EVA | 35-45 |
| Modified Resin | 20-30 |
| Plasticizer | 20-30 |
| Wax | 10-20 |
| Total Plastic Adhesive Material | 100 |
| Antioxidant | 0.05-0.25 php |
| Blowing Agent-Cyclodextrin Complex | 1-10 php |
| Mildewicide (optional) | 1-10 php |

Preferably, the blowing agent-cyclodextrin complex is a water-cyclodextrin complex and has between about 8 to about 15 phc water. More preferably the amount of complex used in the bookbinding adhesive is between about 3 to about 7 pph and has a water content of about 10 to about 15 phc.

Use of a microbial or fungicide complexed with a cyclodextrin, if incorporated with the adhesive, helps prevent degradation. Water will act as the blowing agent and will aid in the release of the microbial or fungicide.

The bookbinding adhesive is made by mixing all the components together in a conventional manner.

Such adhesives have an application temperature around 120 to about 205° C.

The use of a complex of water and cyclodextrin has been found to have several advantages over the prior art of using liquid nitrogen. Present machinery for application of hot melt for bookbinding requires specialized machinery allowing incorporation of liquid nitrogen. With the cyclodextrin-water complex of the present invention a much wider range of equipment can be used. Additionally, the open time has increased, there is more surface contact and less adhesive is used to cover the same area.

A carton and case sealing adhesive is made in accordance with the present invention comprising:

|  | Parts by Weight |
| --- | --- |
| EVA | 40 |
| Modified Resin | 40 |
| Wax | 20 |

| -continued | |
| --- | --- |
|  | Parts by Weight |
| Total Plastic Adhesive Material | 100 |
| Antioxidant | 0.01 php |
| Blowing Agent-Cyclodextrin Complex | 1-10 php |

Preferably, the blowing agent-cyclodextrin complex is a propylene glycol-cyclodextrin complex and has between about 8 to about 15 phc of propylene glycol. Preferably about 3 to about 7 php of the complex is used having a propylene glycol content of about 10 to about 13 phc.

The carton and case sealing adhesive is made by mixing all the components together in a conventional manner.

Such carton and case sealing adhesive has an application temperature between about 175 to about 205° C.

A carpet backing adhesive made in accordance with the present invention comprises:

|  | Parts by Weight |
| --- | --- |
| EVA | 25-50 |
| Modified Resin | 25-60 |
| Waxes | 0-30 |
| Total Plastic Adhesive Material | 100 |
| Antioxidant | .05-0.5 php |
| Filler | 0-100 php |
| Blowing Agent-Cyclodextrin Complex | 1-10 php |

The blowing agent-cyclodextrin complex used in this carpet backing adhesive is a complex of cyclodextrin with about 8 to about 15 phc of either water, propylene glycol or a combination of water and propylene glycol or a combination of water, propylene gylcol and hydrozine derivatives.

Additionally, such a carpet backing adhesive preferably contains a complex of cyclodextrin and mildewcide in an amount up to about 1 php. Suitable mildewcides include diiodomethyl-p-tolysulfone, phenols and butyl-hydroxytoluene; diidomethyl-p-tolysulfone is preferred, the release of which would be triggered by water released by the cyclodextrin.

The carpet backing adhesive is made by mixing all the components together in a conventional manner.

The application temperature of this carpet backing adhesive is between about 300 to 350° F.

A small amount of enzyme known as amylase added to the expandable plastic composition of the present invention will, upon heating, act as a catalyst to speed the release of the blowing agent from the cyclodextrin. For the amylase to act as a catalyst, some water must be present in the plastic composition. It is thought that the amylase will use the water to destroy the cyclodextrin thereby hastening the release of the blowing agent.

It will be understood that other compounds can be added to the plastic material containing the blowing agent of the present invention, to include mildewcides, fungicides, and fragrances.

These and other aspects of the present invention may be more fully understood by reference to the following examples:

EXAMPLE 1

This example illustrates a hot melt adhesive in accordance with the present invention and specifically, a bookbinding adhesive.

| Bookbinding Material | Parts by Weight |
| --- | --- |
| EVA-507 | 45 |
| Staybelite Resin | 25 |
| Pentalyn H | 20 |
| Microcrystalline Wax | 10 |
| Total Plastic Bookbinding Material | 100 |

To the adhesive plastic materials, 0.1 php of an antioxidant and 10 php of a water-beta cyclodextrin complex were added. The complex comprised 7.5 grams of beta cyclodextrin and 2.5 grams of water. The water was complexed with the cyclodextrin by mixing an excess of water with the cyclodextrin. After mixing the adhesive plastic materials with the antioxidant and the water-beta cyclodextrin complex, this admixture was heated to 100° C. at which point the water went from a liquid phase into a gas phase thereby causing an expansion of the adhesive. The percent of expansion by volume of the adhesive was about 100%.

EVA-507 was a commercial grade of a copolymer of ethylene-vinyl acetate obtained from Union Carbide Corp. Staybelite resin was a hydrogenated resin and plasticizer consisting of diethylene glycol esters of hydrogenated resins obtained from Hercules Powder Co. Pentalyn H was a synthetic resin obtained from Hercules Powder Co. Microcrystalline wax was a commercially available wax obtained from Petrolite Corp. of Tulsa, Okla. The antioxidant was Irganox 1010 obtained from Ciba-Geigy Corp. The beta cyclodextrin was a commercial grade beta cyclodextrin obtained from American Maize-Products Company of Hammond, Ind. The water was regular tap water.

It is surprising and unexpected that a complex of cyclodextrin and water worked in this formulation because water, by itself, did not work as a blowing agent in the bookbinding adhesive.

EXAMPLE 2

This example illustrates making a carton and case adhesive in accordance with the present invention. The following adhesive composition was made:

| Material | Parts by Weight |
| --- | --- |
| EVA-305 | 40 |
| CKM-2400 | 15 |
| Piccolyte A-115 | 12.5 |
| Super STATAC | 12.5 |
| Polywax 1000 | 10 |
| Castor wax | 10 |
| Total Plastic Adhesive Material | 100 |

To the adhesive plastic materials, 0.1 php of an antioxidant and 10 php of a complex of propylene glycol-beta cyclodextrin were mixed. The complex contained 1 mole of beta cyclodextrin and 2 moles of propylene glycol. The complex of propylene glycol and beta cyclodextrin was made by mixing an excess of propylene glycol with the beta cyclodextrin.

The admixture of adhesive materials, antioxidant and propylene glycol-beta cyclodextrin complex was heated. Propylene glycol went from a liquid state to a gaseous state thereby causing the expansion of the adhesive composition. The adhesive composition expanded in volume due to the blowing agent, propylene glycol, by about 100%.

EVA-305 was a commercial grade of a copolymer of ethylene-vinyl acetate obtained from Union Carbide. CKM-2400 was obtained from Union Carbide. Piccolyte A-115 was a thermoplastic terpene resin obtained from Hercules. Super STATAC was obtained from Reichold Chemical Inc. Polywax 1000 was obtained from Bareco and Castor wax was obtained from Universal Preservachems. The antioxidant was Irganox 1010. The beta cyclodextrin was a commercial grade beta cyclodextrin obtained from American Maize-Products Company of Hammond, Ind. The propylene glycol was a commercial grade obtained from Dow Chemical.

It is both surprising and unexpected that a complex of propylene glycol and cyclodextrin worked in this formulation since propylene glycol, by itself, did not work as a blowing agent.

EXAMPLE 3

This example illustrates making a carpet backing adhesive in accordance with the present invention. The following adhesive composition was made:

| Material | Parts by Weight |
| --- | --- |
| EVA | 50 |
| Modifying resins | 40 |
| Waxes | 10 |
| Total Plastic Adhesive Material | 100 |
| Mildewicide (optional) | 1–10 php |

To the adhesive plastic materials, 0.1 php of an antioxidant, about 20 php of a filler, and 5 php of a complex of water and beta cyclodextrin are added along with 5 parts of a complex of propylene glycol-beta cyclodextrin. The complexes of blowing agent and cyclodextrin are made in accordance with Examples 1 and 2 above. The complexes of blowing agent and cyclodextrin are both mixed with the adhesive composition simultaneously in a manner according to Examples 1 and 2 above.

Upon heating the admixture of adhesive composition and both blowing agents to about 195° C. the adhesive admixture expands.

The EVA is a commercial grade of a copolymer of ethylene-vinyl acetate. The modified resins are commercial grades of wood Rosin. The waxes are commercial grades of waxes used conventionally in carpet backing adhesives. The antioxidant is Irgonox 1010 and the fillers are conventional calcium carbonate.

EXAMPLE 4

This example illustrates making a pressure sensitive adhesive in accordance with the present invention. The following adhesive composition was made:

| Material | Parts by Weight |
| --- | --- |
| EVA 501 | 15 |
| EVA 605 | 30 |
| Staybelite Ester 10 | 37 |
| Abitol | 18 |
| Total Plastic Adhesive | 100 |

To the adhesive materials, 0.1 php of an antioxidant, Irganox 1010, 5 php of a complex of water and beta cyclodextrin and 5 php of cyclohexylamine and beta cyclodextrin were added. The water and beta cyclodextrin complex had 12.8 phc water. The complex of beta cyclodextrin and cyclohexylamine, volatile corrosion inhibitor, had 8 phc cyclohexylamine complexed with cyclodextrin. Making the complex and mixing of the adhesive composition was done in accordance with Example 1.

The released moisture provided a "trigger" mechanism whereby the complexed cyclohexylamine was partially released so as to be in equilibrium with the released moisture from the water-cyclodextrin complex. Such a mechanism provided corrosion protection to metallic surfaces. The complex of cyclodextrin and cyclohexylamine stabilizes the cyclohexylamine during the heating process. Uncomplexed cyclohexylamine is not stable during the heating of the adhesive. The EVA 501 and 605 were a commercial grade of a copolymer of ethylene-vinyl acetate obtained from Union Carbide. The Staybelite Ester 10 and the Abitol were obtained from Hercules. The application temperature of the adhesive was about 300° F. to 325° F.

EXAMPLE 5

This example illustrates making an expandable, curable sealant in accordance with the present invention.

| Ingredient | Parts |
| --- | --- |
| A. - Hot melt base | |
| Kraton FC 1901 x | 100 |
| (available from Shell) | |
| Regalrez 1018 | 270 |
| (available from Hercules) | |
| Endex 155 | 50 |
| (available from Hercules) | |
| Irganox 1010 | 1 |
| (available from Ciba Geigy) | |
| B. - Plasticizer | |
| Over-Based Calcium Sulfonate | 10 |
| (available from Witco) | |
| Beta cyclodextrin:dicyclohexylamine complex (2:1 molar ratio) | 2 |
| Aluminum paste (50:50 aluminum in Sunpar 2280 available from Sun Oil) | 1 |
| Beta cyclodextrin (10-13% $H_2O$) | 2 |

Equal amounts of the hot melt base and plasticizer were mixed and allowed to cool and then placed on a cold rolled steel sheet or galvanized cold rolled steel sheet. The sheets were placed in an oven and heated at 200° C. for 15 minutes. The material expanded on the plate in both a vertical and horizontal plane such that the mix about doubled in volume.

EXAMPLE 6

A mix of 50 parts hot melt base from Example 5 above was mixed with 50 parts over-based calcium sulfonate. The over-based calcium sulfonate was heated to evaporate water from it prior to mixing it with the hot melt base. The mixture was placed on a cold rolled steel plate and a cold rolled galvanized steel plate and heated in an oven at 200° C. for 15 minutes. The mix upon heating melted and spread out over the plate without expanding.

EXAMPLE 7

A mix was made the same as Example 6 above, except that water was not removed from the over-based calcium sulfonate before mixing and placing it on the cold rolled steel plate and cold rolled galvanized steel plate in the oven at 200° C. The mix in this example simply hardened in place. Curing was accelerated due to the water release as evidenced by the lack of flowing or deformation of the material placed on the sheets.

EXAMPLE 8

A mix was made the same as Example 5 above, except that the mixture was not allowed to cool, was placed on the cold rolled steel sheet and a cold rolled galvanized steel sheet and then placed in the oven at 200° C. This material expanded to about double in volume. The blowing agent-water, was in the cyclodextrin and released upon heating along with the cyclohexylamine-the vapor phase corrosion inhibitor. In the cyclodextrin, the water is controlled and is not available for curing until sufficient heat is applied to trigger its release.

EXAMPLE 9

A conventional sealant was made from:

| Ingredient - Formula A | Parts |
| --- | --- |
| Kraton RD 6501 | 100 |
| (available from Shell) | |
| Regalrez 1018 | 270 |
| (available from Hercules) | |
| Endex 155 | 50 |
| (available from Hercules) | |
| Irganox 1010 | 1 |
| (available from Ciba-Geigy) | |

This material was mixed and placed on cold rolled steel and cold rolled galvanized steel sheets and placed in an oven at 200° C. for 15 minutes. This material melted and spread out on the plate.

EXAMPLE 10

This example uses Formula A to make a sealant in accordance with the present invention.

| Ingredient | Parts |
| --- | --- |
| Formula A | 10 |
| Beta cyclodextrin (10-13% water) | 2 |

These were mixed and placed on cold rolled steel or cold rolled galvanized steel sheets and placed in an oven at 200° C. for 15 minutes. This sealant did expand in volume, however, not by 100% of its initial volume.

EXAMPLE 11

This example illustrates using another chemical blowing agent complexed with the cyclodextrin.

| Ingredient | Parts |
| --- | --- |
| Formula A | 10 |
| Beta cyclodextrin dibutyl tin dilaurate complex (24% chemical blowing agent) | 2 |
| Beta cyclodextrin (10-13% water) | 2 |

After mixing, these were placed on cold rolled steel or cold rolled galvanized steel sheets and placed in an oven at 200° C. for 15 minutes. This material, upon heating, also expanded, to about 100% of its initial volume.

EXAMPLE 12

This example illustrates the use of a complex of beta cyclodextrin and benzoyl peroxide as both a blowing agent and a curing agent for a thermoplastic. The following compositions were made:

| Composition | Amount |
| --- | --- |
| A. Fusabond C-D198 (obtained from DuPont) | 10 g |
| Beta cyclodextrin complex of benzoyl peroxide (10% benzoyl peroxide) | 1 g |
| B. Fusabond C-D198 | 10 g |
| C. Fusabond C-D198 | 10 g |
| Beta cyclodextrin (10% water) | 1 g |
| D. Fusabond C-D198 | 10 g |
| Benzoyl peroxide | 0.1 g |

Each composition was mixed while heating and while still fluid was extruded into sheets of uniform thickness. Portions of equal length and weight were cut from the sheets and placed in an oven at 200° C.

During mixing of the uncomplexed benzoyl peroxide, decomposition of the benzoyl peroxide occurred as evidenced by the formation of bubbles. This was not observed while mixing the complex of benzoyl peroxide and beta cyclodextrin under the same conditions. The amount of benzoyl peroxide was equal in both compositions. In the complexed state, the benzoyl peroxide was stabilized during mixing. It was also difficult to obtain a uniform distribution of the uncomplexed benzoyl peroxide during mixing. The beta cyclodextrin-benzoyl peroxide complex was easily mixed and uniformly distributed during mixing of the composition.

After heating, very noticeable differences were noted. Composition D, containing uncomplexed benzoyl peroxide cured very rapidly and did not spread out laterally to a great extent. Bubbles in the cured composition were not of uniform size and distribution.

Composition A containing the beta cyclodextrin complex of benzoyl peroxide also cured rapidly and did not spread out laterally to a great extent. Blowing and curing were occurring simultaneously. This composition had raised higher than sample D containing uncomplexed benzoyl peroxide. Bubbles in composition A were of uniform size and distribution.

Composition C spread laterally more than any of the other compositions. Water released from the cyclodextrin formed bubbles of uniform size and distribution. The water released was acting as a traditional blowing agent but no curing agent was present to cure the composition to retard spreading.

Composition B spread out laterally more than compositions A and D but not as much as Composition C. No curing agent was present which would retard spreading and no blowing agent was present which would increase spreading.

The best results were obtained from Composition A containing the complex of benzoyl peroxide and beta cyclodextrin. The benzoyl peroxide was stabilized to be released upon heating to act both as a curing agent and a blowing agent. The complex was also easily mixed into and dispersed in the composition.

It will be understood that it is intended to cover all changes and modifications of the preferred embodiment of the invention herein chosen for the purpose of illustration which do not constitute a departure from the spirit and scope of the invention.

What is claimed is:

1. A method for expanding a plastic material comprising:

forming an admixture comprising a plastic, rubbery or resinous material and a complex of cyclodextrin and a blowing agent; and heating said admixture so as to fluidize said plastic material and cause said blowing agent to expand said plastic material while said plastic material is in a fluidized state.

2. The method of claim 1 wherein prior to forming said admixture, a step of forming a complex between said blowing agent and said cyclodextrin is performed.

3. The method of claim 1 wherein the step of heating is accomplished by mixing said plastic material, thereby causing an exothermic reaction in said plastic material.

4. The method of claim 1 wherein the step of heating is caused by the addition of heat to said admixture.

5. The method of claim 1 wherein said plastic material is selected from the group consisting of polystyrene, polyvinyl chloride, polyethylene, polyurethane, polybutadiene, polyphenols, polypropylene, polyisoprene, acrylonitrile-butadiene-styrene, styrene-isoprene, styrene-butadiene rubber, ethylene-butylene and ethylene-vinyl acetate.

6. The method of claim 1 wherein said cyclodextrin is a beta cyclodextrin.

7. The method of claim 1 wherein said blowing agent is one or more components selected from the group consisting of water, propylene glycol, dipropylene glycol, tripropylene glycol, ethylene glycol, cyclohexylamine, dicyclohexylamine and a peroxide.

8. The method of claim 1 wherein about 1 to about 15 parts by weight of said complex is admixed with said plastic material based on 100 parts by weight of said plastic material.

9. The method of claim 2 wherein about 1 to about 30 parts by weight of said blowing agent is complexed with said cyclodextrin based on 100 parts by weight of cyclodextrin.

10. An expandable plastic composition comprising a plastic, rubbery or resinous material and a complex of cyclodextrin and a blowing agent.

11. The expandable plastic composition of claim 10 wherein the blowing agent is one or more components selected from the group consisting of water, propylene glycol, dipropylene glycol, tripropylene glycol, ethylene glycol, cyclohexylamine, dicyclohexylamine and a peroxide.

12. The expandable plastic composition of claim 10 wherein said plastic material is selected from the group consisting of polystyrene, polyvinyl chloride, polyethylene, polyurethane, polybutadiene, polyphenols, polypropylene, polyisoprene, acrylonitrile-butadiene-styrene, styrene-isoprene, styrene-butadiene rubber, ethylene-butylene and ethylene-vinyl acetate.

13. The expandable plastic composition of claim 10 wherein the cyclodextrin is betacyclodextrin.

14. The expandable plastic composition of claim 10 wherein about 1 to about 30 parts by weight of the blowing agent is complexed with the cyclodextrin based on 100 parts by weight of the cyclodextrin.

15. The composition of claim 10 wherein the amount of complex in said composition is between about 1 and about 15 parts by weight based on 100 parts by weight of said plastic material.

16. An adhesive and/or sealant composition comprising an adhesive rubbery or resinous material and a complex of cyclodextrin and a blowing agent.

17. The adhesive of claim 16 wherein said adhesive plastic material is a copolymer of ethylene-vinyl acetate and said blowing agent is one or more components selected from the group consisting of water, propylene glycol, dipropylene glycol, tripropylene glycol and ethylene glycol.

18. The adhesive of claim 16 wherein said complex is present in the adhesive in an amount between about 1 and about 10 parts per 100 parts by weight of said adhesive plastic material.

19. The adhesive of claim 16 wherein said blowing agent is present in said complex in an amount between about 3 and about 30 parts by weight based on 100 parts by weight of cyclodextrin.

* * * * *